United States Patent [19]

Barkhau et al.

[11] Patent Number: 4,740,401
[45] Date of Patent: Apr. 26, 1988

[54] FORMING LAMINATED GLASS CONTAINERS FROM A COMPOSITE ENCAPSULATED GOB OF MOLTEN GLASS

[75] Inventors: Marvin L. Barkhau, Elmore; Frank J. DiFrank; Paul W. L. Graham, both of Toledo; Harry N. Mills, Perrysburg, all of Ohio

[73] Assignee: Owens-Illinois Glass Container Inc., Toledo, Ohio

[21] Appl. No.: 9,870

[22] Filed: Feb. 2, 1987

[51] Int. Cl.⁴ .................... C03B 17/00; C03B 7/00
[52] U.S. Cl. ............................ 428/35; 65/30.14; 65/66; 65/121; 65/126; 65/127; 65/129; 65/145; 428/428
[58] Field of Search ............... 65/66, 121, 127, 129, 65/126, 130, 145, 30.14; 428/428, 35

[56] References Cited

U.S. PATENT DOCUMENTS

| | | | |
|---|---|---|---|
| 3,673,049 | 6/1972 | Giffen et al. | 65/121 |
| 4,021,218 | 5/1977 | Watanabe | 65/30.14 |
| 4,310,595 | 1/1982 | Beall et al. | 65/30.14 |
| 4,457,771 | 7/1984 | Ambrogi | 65/66 |

Primary Examiner—Arthur Kellogg

[57] ABSTRACT

A glass bottle forming system is described in which a main glass melter is connected to a forehearth with a fairly conventional feeder provided at the delivery end of the forehearth. The feeder opening in the bottom of the forehearth is closed by a first orifice member through which a molten core glass will flow. Beneath the first orifice there is positioned a second orifice member that has an orifice that is slightly larger than the orifice in the first orifice member. A small melter contains a glass of essentially the same composition as that in the main melter, but with a coefficient of expansion slightly less than that of the core glass. This lower expansion glass is fed to the second orifice member so that it can flow out of the orifice with the core glass in surrounding relationship with respect thereto. The skin glass melter is connected to the second orifice member by a gravity feed system in which the connection is thermally controlled so that the viscosity of the two glasses are maintained essentially the same. Two embodiments of the skin melter and the second orifice are disclosed. In one embodiment the second orifice is vertically adjustable so as to vary the volume of skin glass flow relative to the core glass flow. The second embodiment has the second orifice supporting an annular bushing that is vertically adjustable and it cooperates with the bottom of the upper orifice member to regulate the flow of glass into surrounding relationship to the core glass coming through the first orifice member.

11 Claims, 11 Drawing Sheets

FORMING LAMINATED GLASS CONTAINERS FROM A COMPOSITE ENCAPSULATED GOB OF MOLTEN GLASS

BACKGROUND OF THE INVENTION

It has been possible to form laminated glass articles, such as laminated tubing and laminated sheet glass, wherein a continuous flow or stream of the composite glass is delivered to form such tubing or sheet as desired. U.S. Pat. No. 4,023,953 illustrates a method and apparatus for continuously producing composite glass tubing.

U.S. Pat. No. 3,582,306 describes method and apparatus for continuously forming a composite sheet or ribbon of molten glass directly from a plurality of flows of molten vitreous material and U.S. Pat. No. 3,582,454 discloses method and apparatus for forming articles, such as plates and cups, from such continuous sheet of the composite material. In this patent molten glass is described as being delivered to first form a continuous composite sheet which is subsequently formed and trimmed into articles.

The thus described prior art related to the formation of composite articles, such as tubing and sheet from a continuous flow of a composite glass. The selection of the glass compositions, such as those disclosed in U.S. Pat. No. 3,673,049, may be such as to provide a strengthened blown or pressed laminated article having a compressive outer skin according to a recently issued U.S. Pat. No. 4,457,771, which discloses the concept of forming laminated articles having a core of one glass completely surrounded by a skin of a second glass. A descrete charge of molten glass is formed from a plurality of separate and distinct glasses in such a manner that each charge has a core glass of one composition completely encapsulated within and surrounded by a skin glass of a second composition. The descrete charge is delivered while in a molten state to a mold or forming surface wherein a positive force is applied thereto, such as pressing or blowing to form a laminated article. The delivery apparatus for forming the laminated charge in U.S. Pat. No. 4,457,771 is described as comprising a core glass container having an orifice opening and an outer skin glass container having an orifice opening concentric with but below the core glass central orifice opening. The core glass container is provided with suitable conduit means for delivering molten core glass from a suitable supply thereof, such as a melting tank. In a like manner, the outer skin glass container is provided with suitable conduit means for supplying molten skin glass from a supply thereof, such as a melting tank, to the other container. A pneumatic bell immersed in the core glass container is used to apply pressure or vacuum as desired. Likewise, a baffle extending into the skin glass container is described as being connected to a source of pressure or vacuum for controlling the flow of skin glass.

While the described prior art suggests making an encapsulated, composite gob of two separate glass compositions and teaches a method and apparatus for forming the charge or gob, there is no teaching or suggestion of using soda-lime-silica glasses of generally similar characteristics with the skin glass being essentially the same as the core glass with the core glass viscosity-versus-temperature curve being very similar to the viscosity-versus-temperature curve of the skin glass and at the log 3 viscosity having essentially identical temperature. Thus the glasses are capable of being fed to a gob feeder at essentially the same temperature-viscosity condition to permit formation of "cased" gobs or charges of molten glass.

SUMMARY OF THE INVENTION

The present invention sets forth the concept of forming laminated glass articles having a core of one glass completely surrounded by a skin of slightly modified form of the same one glass at substantially identical temperature-viscosity conditions. The laminated articles are formed from a laminated gob of molten glass fed from a modified glass gob feeder where the core glass is fed through a member having one or more orifices each axially disposed below a reciprocating plunger and the skin glass is fed to an area beneath the core glass orifice member into surrounding relationship with respect thereto with the core glass being controllably surrounded with flowing skin glass as the glasses pass through a lower orifice member.

Thus it is an object of the present invention to controllably form and simultaneously feed plural, composite, laminated glass gobs where the gobs have a core glass and skin glass that are essentially identical in viscosity in the temperature range of 1000° F. to 2700° F. and with the coefficient of expansion of the skin layer being between $5-15 \times 10^{-7}$ in/in ° C. less than that of the core glass.

DETAILED DESCRIPTION OF THE DRAWINGS

Figure 1:
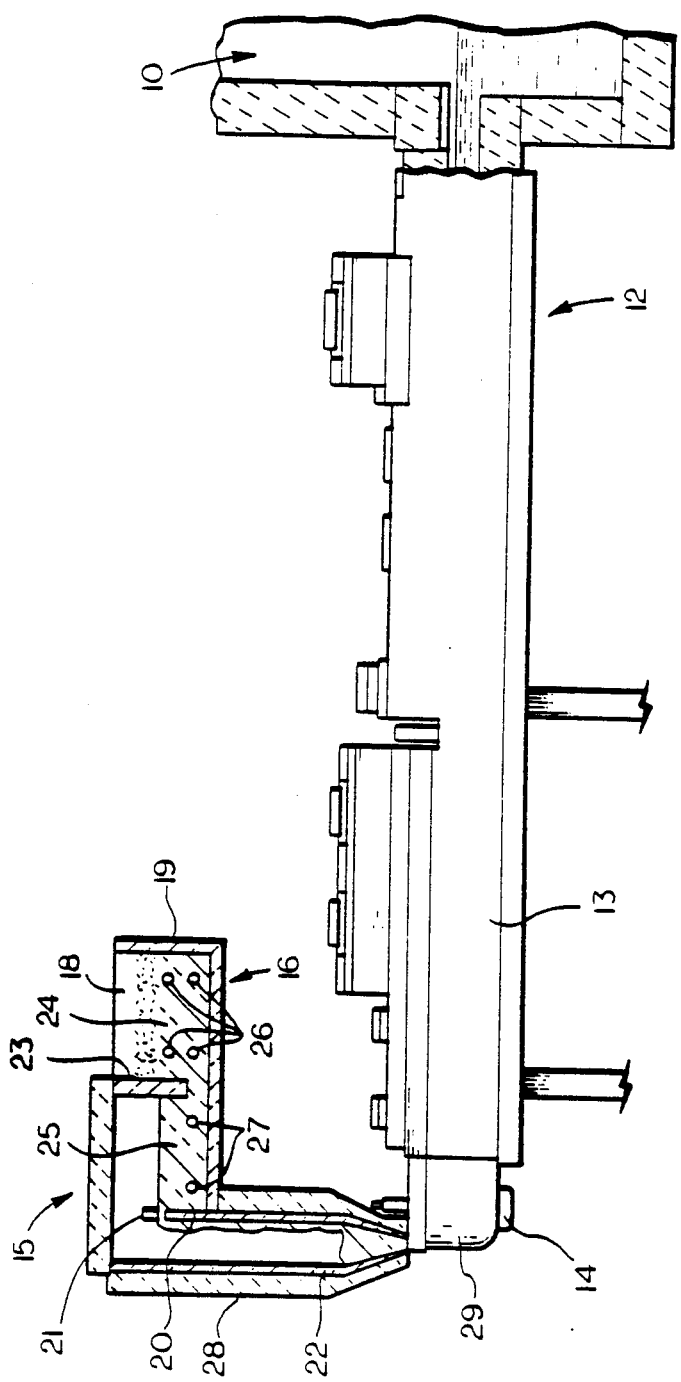
FIG. 1 is a schematic side elevational view of a forehearth and feeder incorporating a first embodiment of the invention.

With particular reference to FIG. 1, there is shown in cross-section the forward or discharge end of a molten glass containing refiner 10. The molten glass passes from the refiner through an opening 11 into the feed end of a forehearth 12. The forehearth 12 is generally of conventional design and provides the means to convey the molten glass which, in the present case is the core glass, through a conditioning section 13 to a gob feeder 14.

As illustrated in the embodiment of FIG. 1, a small volume melter and refiner 15 is positioned above the conditioning section of the forehearth. The small melter 15 is formed as a generally rectangular chamber 16 composed of a bottom wall 17 and side walls 18 (only one of which is shown). An end wall 19 closes the right hand end of the chamber 16 with the opposite end closed by a wall 20. The wall 20 is provided with a centrally located overflow feeder notch 21 through which a controlled quantity of molten glass is fed into a vertically extending transfer tube 22. A curtain wall 23 in the melter 15 extends from above and has its lower end immersed in the molten glass in the chamber 16. The curtain wall effectively divides the chamber 16 into two compartments 24 and 25. The compartment 24 is the melting section and may be open topped but covered by a blanket of batch ingredients. As illustrated, the melter compartment 24 is provided with a pair of electrodes 26 for providing the heat to melt the batch ingredients that are spread over the top of the compartment 24.

The molten glass, in this case the glass to be used as the skin glass, flows from beneath the wall 23 into the forward compartment 25. The glass will remain in this compartment 25 and be refined to a certain extent by electrodes 27 extending into the glass and the fact that the glass must move upwardly to near the surface as it passes through the notch or overflow wier 21. For control purposes the wier 21 may be adjustable to regulate the volume of glass passing to the tube 22. The refining of glass is generally a time and temperature situation where the molten glass is kept at a desired temperature/viscosity for a sufficient period so that seeds and blisters can reach the surface or become dissolved in the glass before it issues into the transfer tube 22. The compartment 25 is shown as having a cover thereon to cut down on heat loss and the transfer tube is provided with insulation 28 to prevent excess heat loss during the glass transfer.

Figure 2:
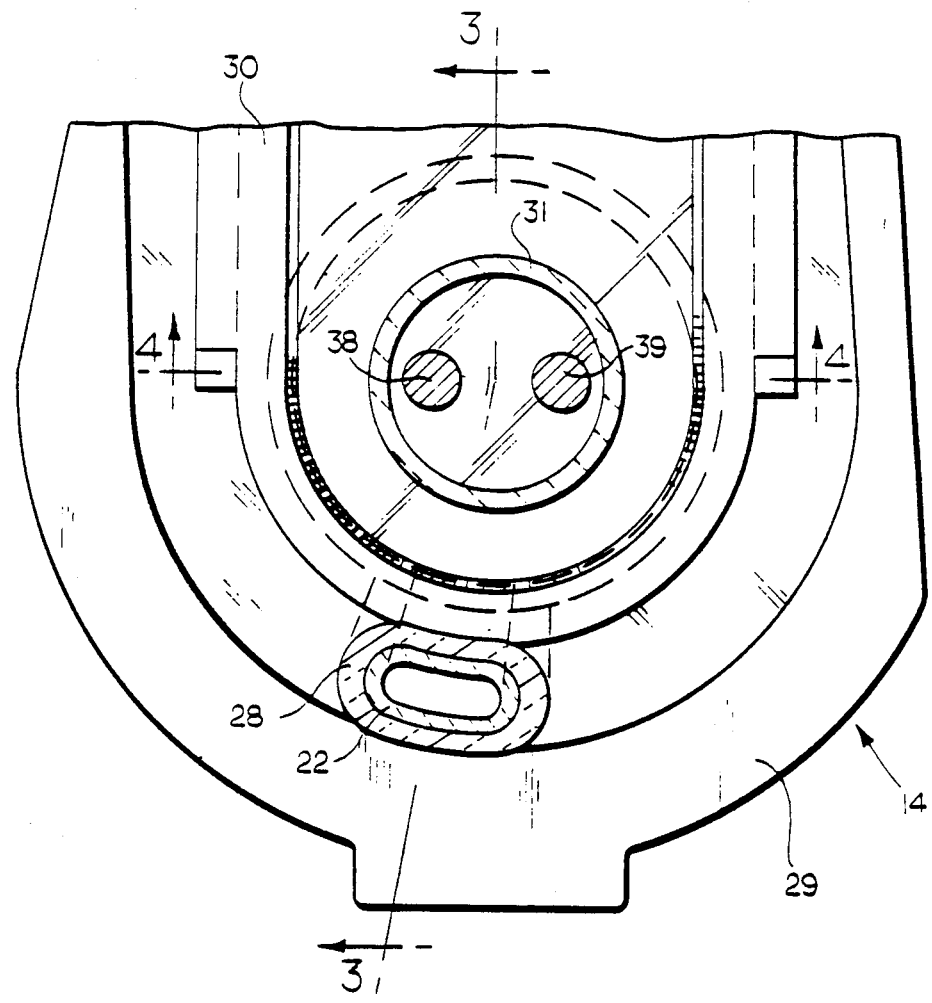
FIG. 2 is a schematic top plan view of the feeder section of FIG. 1 on an enlarged scale.
Figure 3:
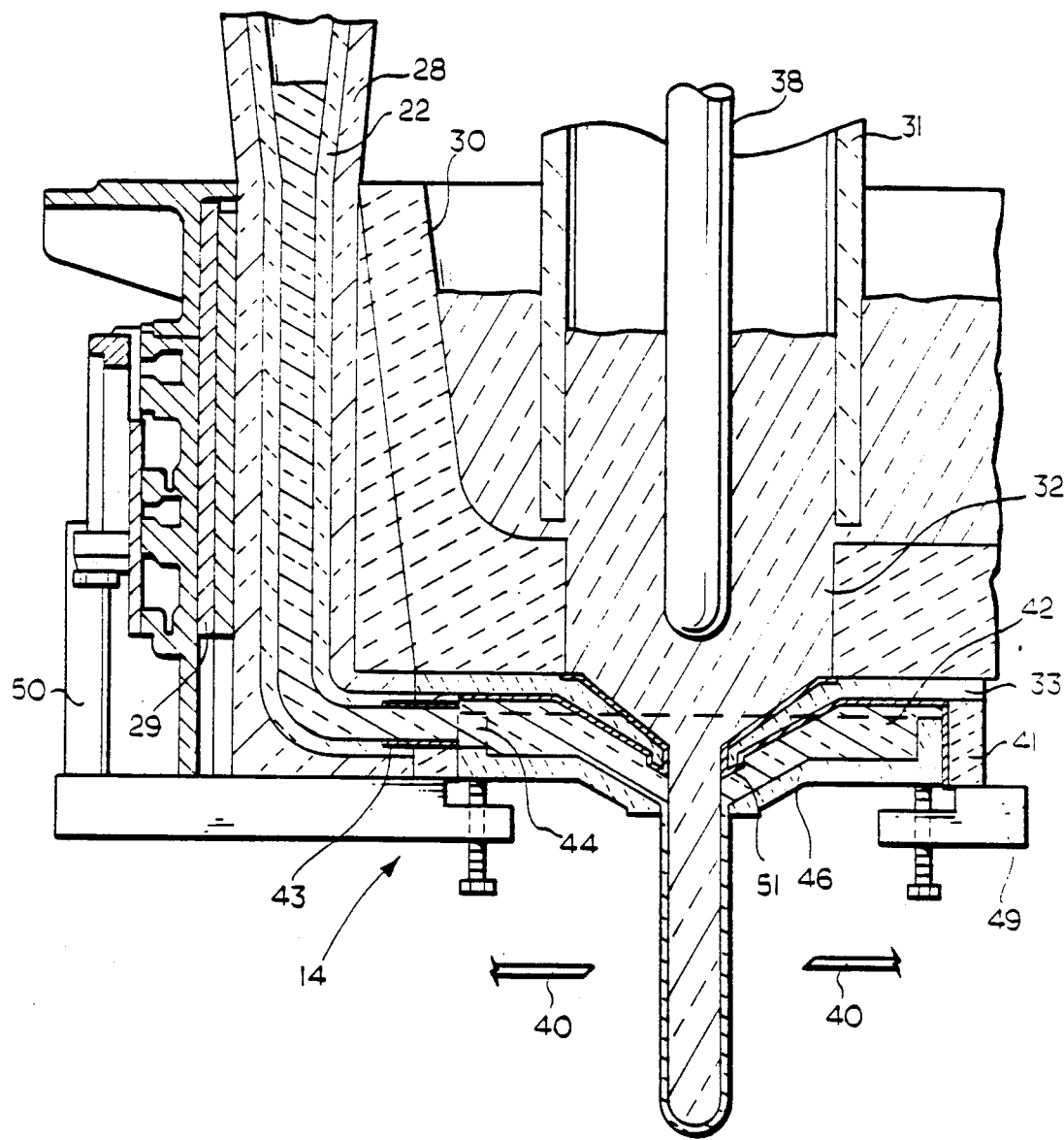
FIG. 3 is a cross-sectional view taken at line 3—3 of FIG. 2.
Figure 4:
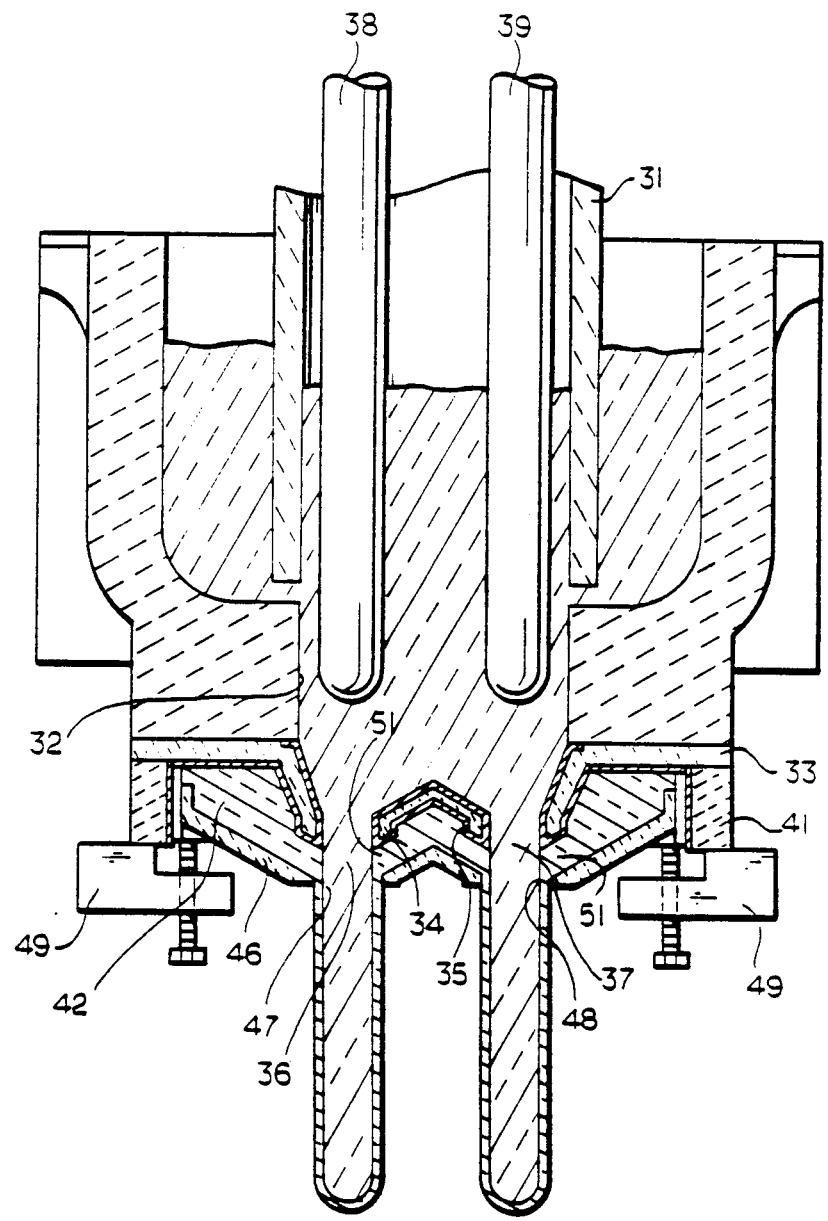
FIG. 4 is a cross-sectional view taken at line 4—4 of FIG. 2.

Turning now to FIGS. 2-4, the details of the unique gob feeder 14 for providing gobs of a core glass surrounded by a skin glass will be described.

Generally speaking, the feeder 14 comprises an outer cast iron shell 29 which serves as the supporting structure for a refractory bowl 30 positioned within the shell 29. The bowl 30 is open at one side and it is this side which abuts the end of the conditioning section of the forehearth 13. The glass in the forehearth will flow into the feeder bowl 30 into surrounding relationship to a refractory tube 31. The tube 31 is supported from above by means not shown and the tube 31 is rotated about its vertical axis and serves to keep the glass in the bowl at a generally constant temperature and viscosity in the area surrounding the tube. The lower end of the tube is positioned above the bottom of the bowl 30, in alignment with a lower opening 32 in the bottom of the bowl. The tube height relative to the bottom of the bowl is a carefully regulated factor since this gap between the tube and the bowl bottom serves to regulate the volume of glass that will flow through the opening 32.

As previously stated, the glass in the bowl is the so-called "core" glass which represents about 95% by weight of the glass article, such as a bottle, to be formed. Closing the opening 32 is a dual orifice ring member 33 which may be formed of molybedenum with platinum cladding to resist erosion at high temperature.

The member 33 has a pair of orifices 34 and 35 formed therein through which the core glass may flow in downwardly moving streams 36 and 37. The streams 36 and 37 are regulated by the vertical reciprocation of a pair of feeder plungers 38 and 39 which typically are formed of a refractory material. The plungers are mounted from above by a conventional reciprocating mechanism (not shown). In effect, the reciprocation of the plungers serves to extrude the core glass through the orifices in a controlled manner to produce descrete charges of glass that can be severed by a pair of shear blades 40 which are schematically illustrated.

Within the supporting shell 29, beneath the core glass feeder bowl 30, is positioned a ring-like member 41 forming a shallow chamber 42 into which the lower end 43 of the feeder tube 22 is connected for the feeding of the "skin" glass. The skin glass will enter the shallow chamber 42 in surrounding relationship to the orifice ring 33. The orifice ring 33 is held against the bottom of the bowl 30 by the ring member 41. The member 41 also serves as an annular guide for a lower orifice ring 46 which is maintained in engagement with the inner wall of the member 41 with the end 43 of tube 22 extending through an opening 44 therethrough. The lower orifice ring 46 is formed with downwardly sloping inner walls which terminate in a pair of openings 47 and 48. The lower orifice ring 46 is supported on a holder 49 that is mounted for swinging about a vertical axis 50 to expose the underneath of the opening 32 to facilitate the changing of the orifice rings and pan. In the present case the skin glass which fills the chamber 42 will pass down through the openings 47 and 48 in surrounding relationship with the streams 36 and 37 of core glass. The feeding of the skin glass will be controlled by the vertical spacing or gap 51 formed between lower ends of the orifices 34 and 35; and the top of the orifices 47 and 48. Also, pressure created by the head or height of glass maintained in the transfer tube 22 may be adjusted during the operation of the feeder and will have the effect of varying the volume of skin glass being delivered and thus the thickness of the skin glass covering the core glass.

The size of the gap also is selected to match the desired skin glass thickness to be formed on the core glass stream.

It can readily be seen that as the core glass is being extruded as streams which pass through the openings 47 and 48, the gap between the openings and the core glass will be filled by the skin glass. As previously indicated, the plungers 38 and 39 are reciprocated and during their upward or retracting motion, the flow of core glass will be diminished, which permits the skin glass to become somewhat thicker in section during this interval. In this way, and in conjunction with the timing of the shearing mechanism, the streams can be sheared at the zone where the skin glass is thickest, resulting in the skin glass extending over the entire ends of the severed gob or charge. Severing will normally take place during the period when the plungers are retracting.

One example of a skin or "low" expansion glass that would be suitable for forming the skin on gobs to be formed into glass containers and an example of a suitable core or "high" expansion glass for use with the skin glass would be as follows:

|  | SKIN "LOW" EXPANSION | CORE "HIGH" EXPANSION |
|---|---|---|
| Ottawa Sand (lbs.) | 2000 | 2000 |
| Soda Ash | 552 | 633 |
| Miss. Limestone | 555 | 668 |
| Syenite "A" | 50 | 535 |
| Salt Cake | 36 | 36 |
| Carbrite | 2.16 | 2.16 |
| Glass Made (t.) | 1.3528 | 1.6488 |
| % $SiO_2$ | 74.98 | 70.36 |
| $Al_2O_3$ | 0.50 | 3.86 |
| $TiO_2$ | 0.007 | 0.006 |
| $Fe_2O_3$ | 0.026 | 0.036 |
| CaO | 11.36 | 11.26 |
| MgO | 0.07 | 0.06 |
| $Na_2O$ | 12.69 | 13.38 |
| $K_2O$ | 0.10 | 0.81 |
| $SO_3$ | 0.28 | 0.23 |
| Log 2 (°F.) | 2664 | 2665 |
| Log 3 | 2191 | 2190 |
| Log 7 | 1424 | 1422 |
| F.S.P. | 1359 | 1362 |
| A.P. | 1028 | 1034 |
| Liquidus | 1874 | 1954 |
| Cool Time (Sec.) | 97.2 | 97.5 |
| Density (GR/CC) | 2.4932 | 2.5072 |
| U.S.P | 7.2 | 5.2 |
| Exp. Coeff. | 83.9 | 88.9 |

It should be understood that the glasses set forth as examples are soda-lime-silica glass for forming glass containers. It can be noted that the viscosities and densities of these glasses are very close but have an expansion coefficient difference of $5 \times 10^{-7}$ in./in. °C.

Taking a typical example of a glass container formed with the glasses set forth above, through a finite element stress analysis, resulted in a 3,000 psi surface compression. The surface layer thickness of 0.004" with an expansion coefficient of $5 \times 10^{-7}$ in./in. °C. less than the core glass thickness of 0.080" creating a 2500–3000 psi compressive surface stress.

A second example of a "skin" glass composition and its comparison "core" glass composition is as follows:

|  | SKIN OR LOW EXPANSION GLASS | CORE OR BASE GLASS |
|---|---|---|
| % $SiO_2$ | 72.03 | 73.19 |
| $Al_2O_3$ | 0.42 | 1.30 |
| $Fe_2O_3$ | 0.052 | 0.053 |
| $TiO_2$ | 0.013 | 0.013 |
| CaO | 12.76 | 11.50 |
| MgO | 0.15 | 0.13 |
| BaO | 3.71 | 0.00 |
| $Na_2O$ | 10.58 | 13.36 |
| $K_2O$ | 0.07 | 0.26 |
| $SO_3$ | 0.21 | 0.20 |
| Log 2 | 2620 | 2631 |
| Log 3 | 2169 | 2168 |
| Log 7 | 1435 | 1412 |
| F.S.P. | 1375 | 1350 |
| A.P. | 1048 | 1025 |
| Liquidus | 1905 | 1885 |
| Cool Time (sec.) | 92.0 | 98.0 |
| Density (gr/cc) | 2.5663 | 2.5018 |
| Exp. Coeff. | 82.3 | 87.3 |
| U.S.P. | 5.9 | 7.0 |

Figure 12:
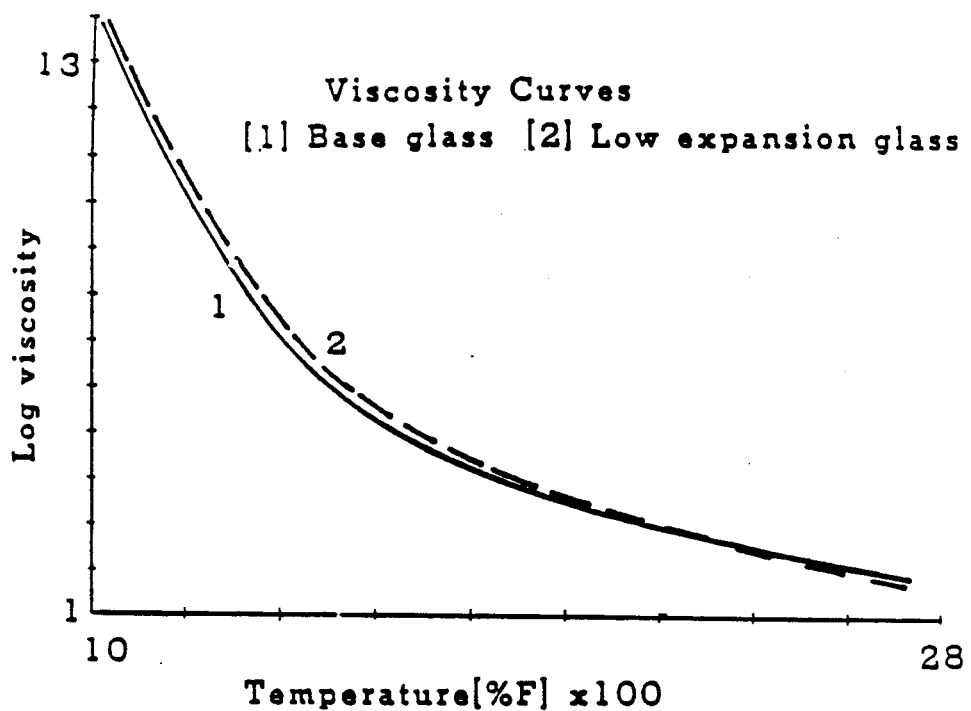
FIG. 12 is a graph of viscosity curves of skin and core glasses.

The viscosity curves for the above glass is as shown in FIG. 12. The log viscosity differences between the core glass and skin glass in the two examples is clearly less than 00.5%.

Figure 5:
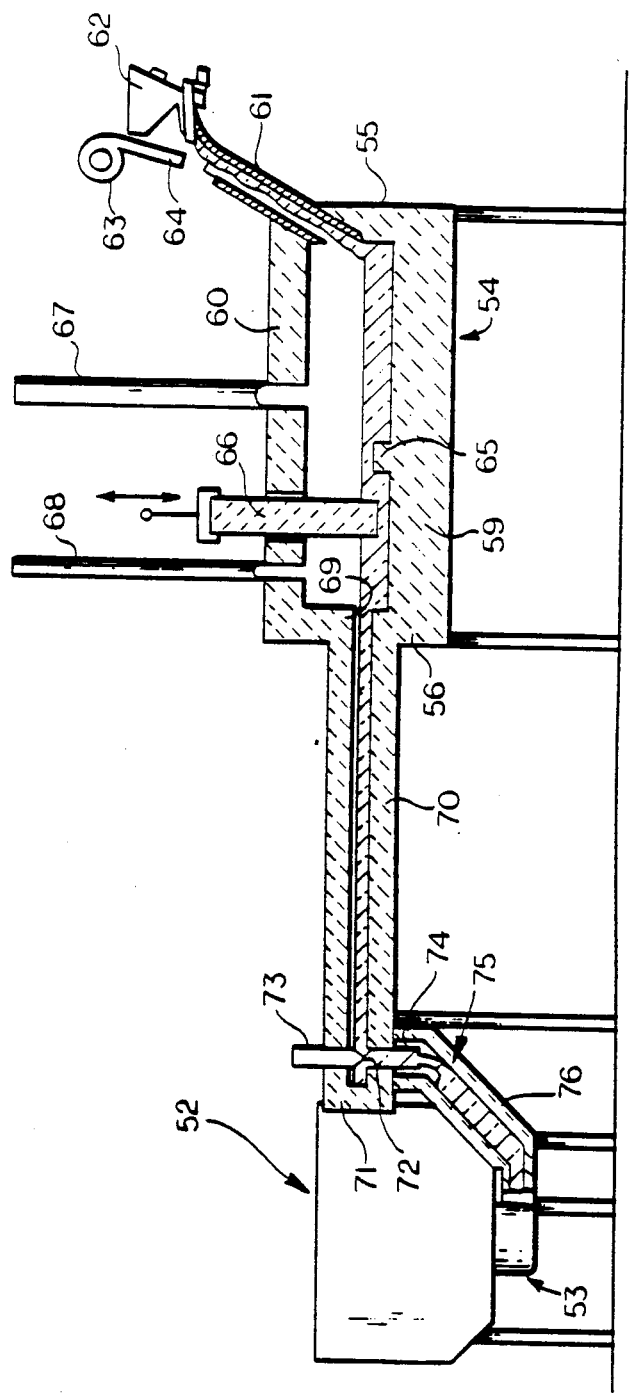
FIG. 5 is a schematic, side elevational view, in section, of a skin glass melter, forehearth and transfer tube in accordance with a second embodiment of the invention.
Figure 6:
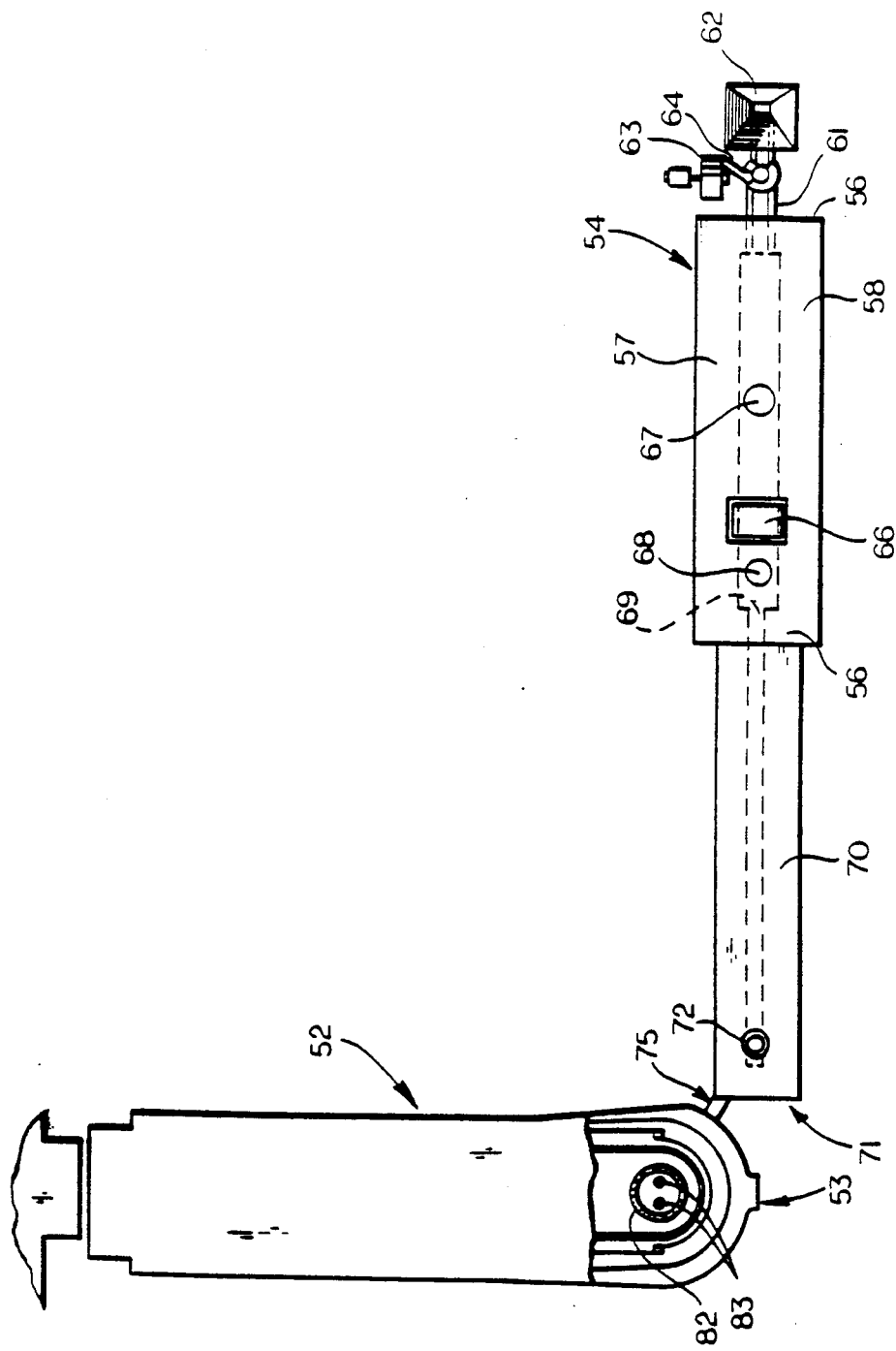
FIG. 6 is a top plan view of the skin glass melter, forehearth and transfer tube shown in FIG. 5.

With particular reference to FIGS. 5 and 6, the description of a second, preferred embodiment of the apparatus of the invention for forming gobs of molten glass where the gobs have a core of one glass and a thin skin layer of a similar glass, as set forth above, is described.

A core glass containing forehearth 52, which is generally similar to that shown in FIG. 1, has a feeder, generally designated 53, at its delivery end. The feeder 53 will be described in detail in connection with FIGS. 7–11. In conjunction with the forehearth 52 for supplying a core glass to the feeder is a skin glass supplying system which is best illustrated in FIGS. 5 and 6 where there is shown a glass melting tank 54. The tank 54 may be formed of the usual firebrick and has the configuration of a rectangular chamber with end walls 55, 56, side walls 57, 58, bottom 59 and top 60. Extending out through the end wall 55 and the adjacent corner of the top 60 is a supply conduit 61 through which the batch ingredients for the "skin" glass may be fed. A batch charger having a hopper 62 and the usual motor driven discharge system will feed batch to the upper end of the inclined conduit 61. Additionally, a blower 63 has its outlet pipe 64 directed toward the upper half of the batch charging conduit to provide an air flow along the conduit and over the surface of the molten glass in the tank 54. Approximately two-thirds of the length of the tank from the batch feed end 55 is a raised sill block 65 which serves to hold back any unmelted batch from passing too quickly to the discharge end 56 of the tank. A skimmer block 66 that is as wide as the channel in melter or tank 54, extends through an opening in the top 60 and is supported from above for vertical adjustment so that its lower end may be held above the bottom of the channel at a preselected distance. It can thus be seen that as the skin glass batch is melted, the sill 65 and skimmer block 66 will prevent unmelted batch from reaching the end wall 56, since the bottom glass must pass over the sill block 65 and the surface glass pass under the skimmer block 66. The tank 54 will have the usual series of fuel burners that extend through the side walls along the length thereof and the flames of the burners are set to apply heat to the surface of the glass in the tank on both sides of the skimmer block. The products of combustion are exhausted from the tank through a pair of stacks 67 and 68 extending through the top of the tank. The end wall 56 of the tank 54 is provided with an opening 69 which is in communication with an elongated, enclosed conditioning channel or forehearth 70 through which the molten and refined skin glass will flow. The top of the forehearth 70 is spaced above the top of the glass therein but there is not much clearance since the object of the elongated channel or forehearth 70 is to let the glass in the forehearth cool down to a preselected temperature and viscosity, somewhat less than that prevailing in the melter. The channel 70 is shown as being about as long as the melter. The temperature of the glass in the forehearth or channel 70 can be controlled by having a number of heaters (not shown) along its length. The exit end 71 of the forehearth 70 has a bottom discharge opening 72 therein. Above the opening 72 and extending through the top of the forehearth is a needle valve 73 whose function is to control the flow rate of molten skin glass through opening 72. In alignment with and beneath the opening 72 is positioned the open, upper end 74 of a transfer tube 75. The transfer tube 75 may be formed of a heat resistant metal such as platinum, and it is surrounded by several inches of insulation 76. In addition, electric, strip type, resistance heater elements may be mounted about the tube to control the heat loss through the tube. Transfer tube 75 has a generally vertical upper end 74 which merges into a downwardly sloping or inclined section 77 and a generally horizontal lower section 78. The lower section 78, as shown in FIGS. 7 and 10, extends into the side of a lower orifice ring 79.

Figure 7:
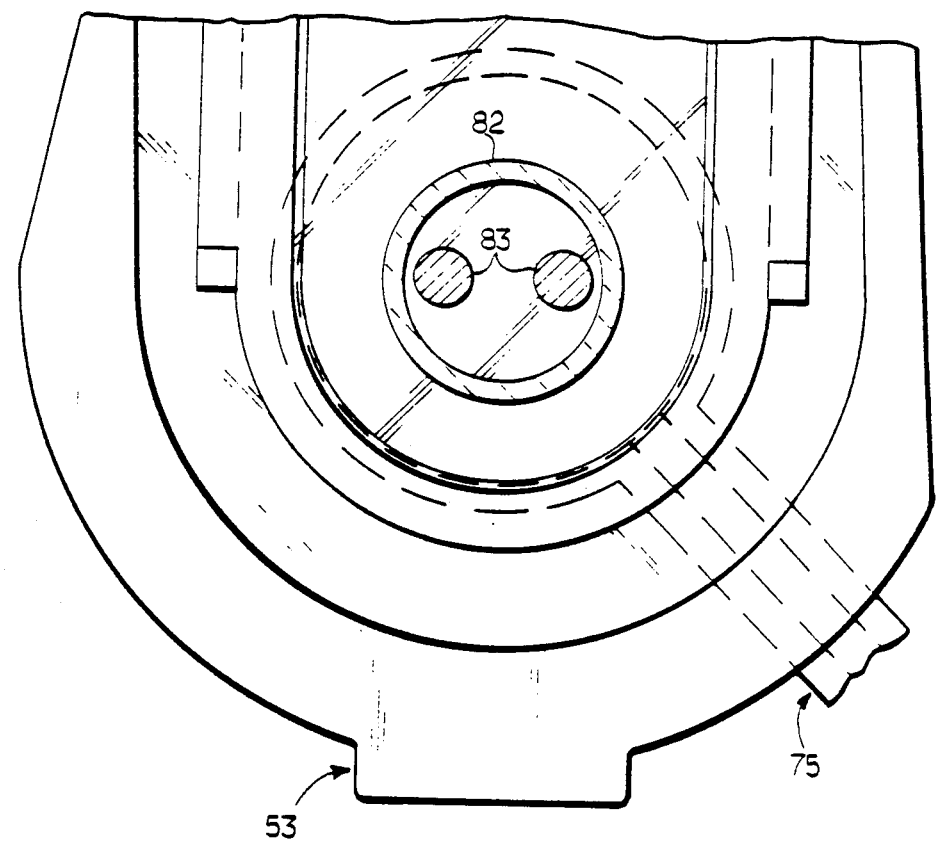
FIG. 7 is a plan view of the gob feeder section of the main forehearth of FIG. 6 on an enlarged scale.

The plan view of the feeder 53 shown in FIG. 7 illustrates a bowl 80 surrounded by metal feeder nose 81 which, in practice, is connected to the exit end of the forehearth 52. The bowl 80 is sealed to the end of the forehearth channel and, in effect, forms a continuation of what is termed the "equalizing cooling section" of the forehearth. The molten glass which forms the core glass will flow into the bowl 80 in surrounding relationship to a rotatably driven tube 82 and a pair of vertically reciprocated plungers 83. The tube 82 overlies a bottom opening 84 in the bowl 80 which has a tapering sidewall joined to lower generally circular outlet 85.

Underlying and surrounding the outlet 85 is a main or core glass shaping ceramic orifice member 86. The orifice member 86 has an upper annular bead 86a which serves to provide a matching surface for orifice member 86 and the bottom of the feeder bowl 80. The orifice member has inwardly tapering inner sidewalls 87 which terminate at their bottoms in a pair of orifices 88 and 89 separated by a central web 90.

Figure 8:
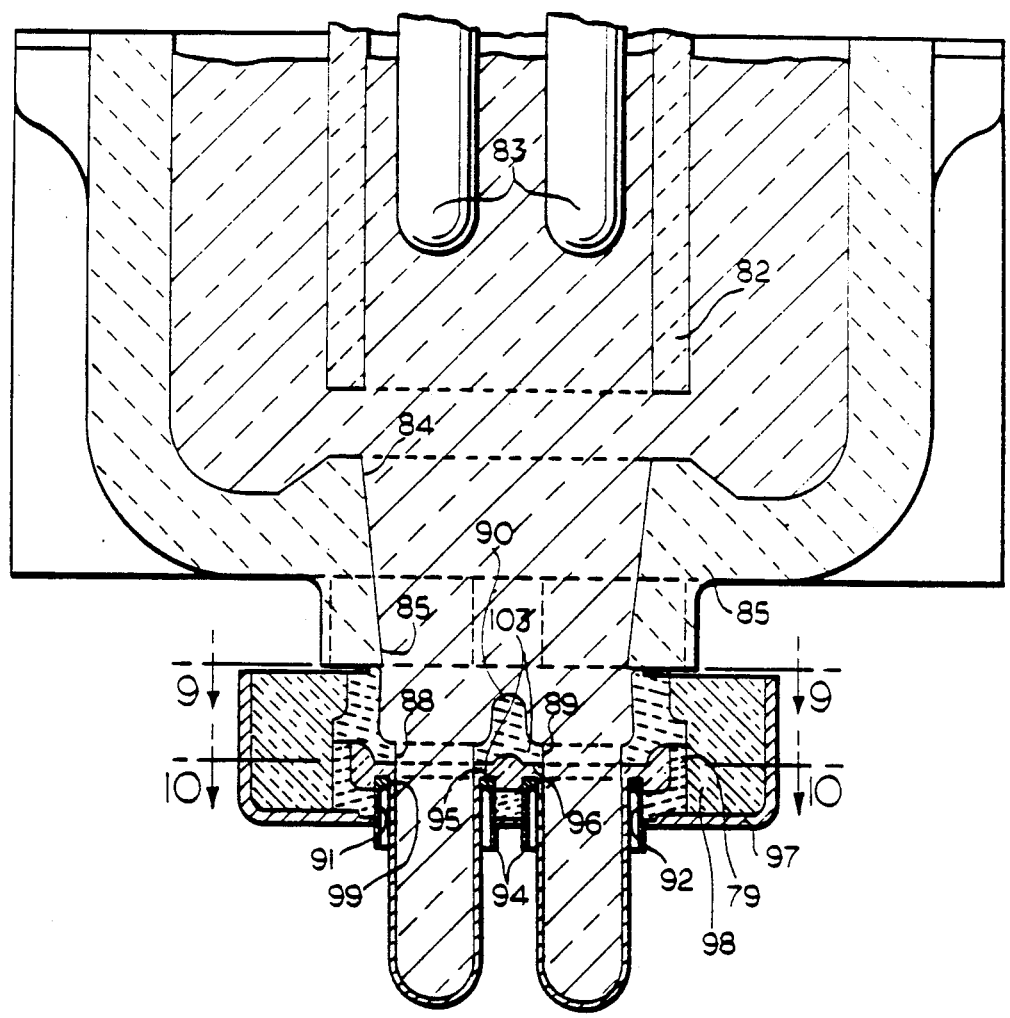
FIG. 8 is a cross-sectional view taken at line 8—8 of FIG. 7.
Figure 10:
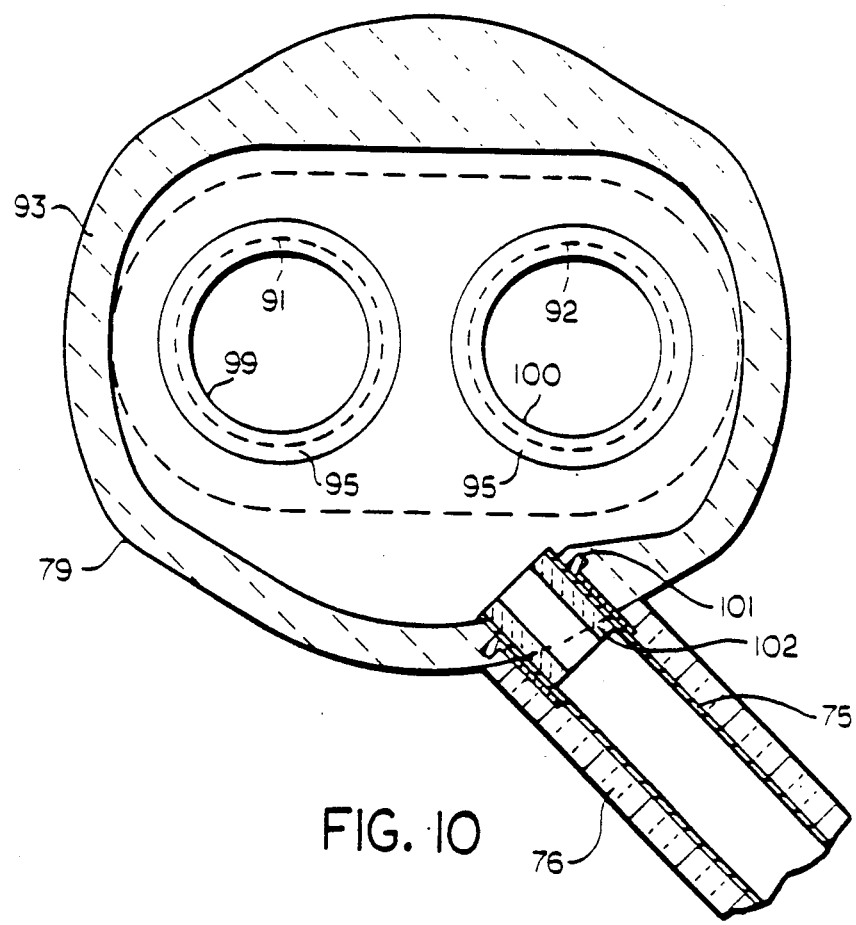
FIG. 10 is a cross-sectional view of the lower orifice member taken at line 10—10 of FIG. 8.
Figure 11:
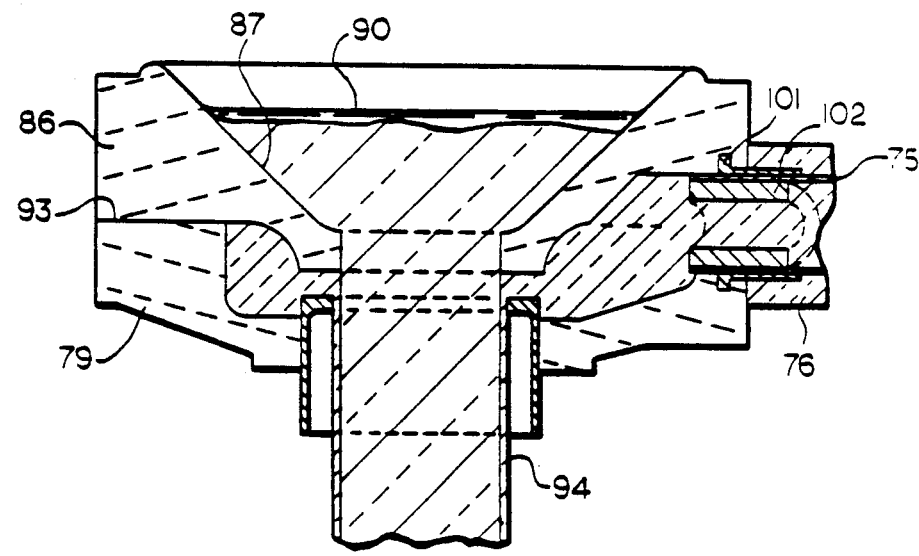
FIG. 11 is a cross-sectional view of both orifice members taken at line 11—11 of FIG. 10.

Beneath the main orifice member 86 is the secondary or "skin glass" orifice member or ring 79 as best shown in FIGS. 8, 10 and 11. The orifice ring 79 is formed as a shallow bowl with a pair of openings 91 and 92 in the bottom thereof. The openings 91 and 92 are in vertical alignment with the openings 88 and 89, respectively, in the main orifice member 86 and are of a somewhat larger diameter. The ring 79 has an upper rim 93 which is held against the bottom rim of the main orifice member 86. Within each of the openings 91 and 92 is positioned a cylindrical bushing 94. Each bushing has an outer diameter which is essentially the same as the diameter of the openings 91 and 92. The bushings 94 have flat, inwardly extending upper rim portions 95 which underlie flat annular bottom surfaces 96 of the main orifice member 86 in the area surrounding each orifice 88 and 89. Each of the bushings 94 has threads formed in their outer surfaces with the threads cooperating with threaded openings formed in a metal pan 97 that surrounds and supports the orifice ring 79 and orifice member 86. The pan 97 is shown filled with insulation 98. The rim portions 95 of the bushings 94 form annular openings 99 and 100 which are coaxial with the orifice openings 88 and 89 of the core glass orifice member 86.

As previously explained, the lower orifice ring 79 receives molten and refined skin glass through the delivery tube 75. The delivery end of the tube 75 extends through a sleeve 101 which is positioned in an opening in the side of orifice ring 79. A tubular orifice member 102 is positioned in the end of the delivery tube 75 to provide an accurate flow regulating nozzle for the skin glass. The size of the opening in the tubular orifice member 102 is chosen depending upon the desired flow rate for the skin glass considering its viscosity and temperature requirements.

Figure 9:
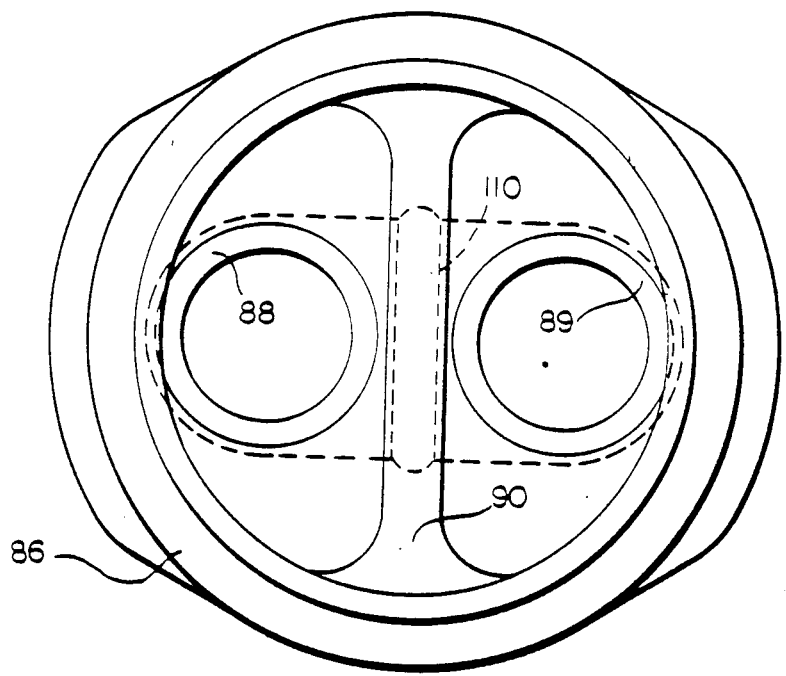
FIG. 9 is a top plan view of the orifice members taken at line 9—9 of FIG. 8.

The lower surface of the central web 90 is illustrated in FIG. 8 and by the dotted line 110 in FIG. 9 to have an upwardly tapering surface from the center toward the opposite ends in order to avoid any entrapment of air between the orifices during operation of the feeder.

From the foregoing description, it can be seen that the core glass will flow down through the orifices 88 and 89 under the influence of the plungers 83. The diameter of the streams will be determined by the diameter of the openings 88 and 89. The openings 88 and 89 are of slightly smaller diameter, by about 0.060 inches, than the openings 99 and 100 formed in the bushings 94. Thus as the core glass passes down through the bushings 94, a thin layer of skin glass which is present in a gap 103 between the surface 96 of member 86 and the rim 95 of the bushings 94, will surround and flow with the core glass to provide a stream of layered glass. The gap 103 may be adjusted in size by the threading in or out of the bushings 94.

While the orifice members 86 and ring 79 are shown as positioned within a pan 97 filled with insulation 98, it is apparent that the area between the pan and orifice member may be "gas fired" by providing burners whose flames will impinge on the outer surfaces of the orifice member and ring at circumferentially spaced positions thereabout to effectively provide a controlled temperature to the glass, both core and skin, as it streams from the feeder.

Beneath the feeder structure and mounted thereto will be the usual shear mechanism (not shown) for severing the streams into descrete gobs or charges of encapsulated glass. The charges are delivered by gravity to the forming machines which will form the gobs into hollow glass articles such as bottles or jars by the well known I.S. glass forming machine.

Instead of gas firing about the orifice member and ring, a plurality of electrical, strip resistance elements could be positioned within the insulation contained in the pan 97. The number and position of these heaters would be chosen depending on the anticipated zones or quadrants where the greatest heat loss would be experienced and appropriate temperature sensing elements placed near the orifice members would be used as the input to temperature controller for providing current to the resistance heaters.

What is claimed:

1. A multiple gob glass feeder for feeding plural gobs of a molten core glass that are encased in molten skin glass of a composition that has a lower coefficient of expansion comprising, a generally horizontal forehearth which has a feeder bowl closing one end and a supply of molten soda-limesilica, core forming glass connected to the other end of said forehearth; said feeder bowl being formed with a lower opening therethrough, a first multiple gob orifice ring closing said lower opening in said bowl, a generally open-topped refractory chamber sealed against the bottom of said first orifice ring, said chamber having an opening in its bottom that is in alignment with the opening in the bottom of said bowl, a second multiple gob orifice ring in engagement with said chamber and closing the bottom opening therein, a relatively small volume glass melter for melting a soda-lime-silica, skin forming glass, delivery means connected between said glass melter and said chamber, said first and second orifice rings defining plural, vertically aligned orifices, the orifices in said second orifice ring having a diameter slightly greater than those in the first ring such that core glass passing through said first orifice ring will flow downwardly through said second orifice ring with a thin layer of skin glass flowing downward with said core glass in surrounding relationship thereto.

2. The feeder of claim 1 further comprising means for controlling the volume of flow of skin glass from the chamber into surrounding relationship with respect to the core glass.

3. The feeder for feeding plural gobs of molten glass as set forth in claim 2 wherein said means for controlling the volume of flow of said skin glass further includes an annular bushing positioned in and extending vertically through each of said second orifices, said bushings having an internal diameter that is slightly larger than the diameter of the orifices in said first orifice ring.

4. The feeder of claim 3 wherein said bushings are generally vertically, cylindrical members of a high temperature resistant metal.

5. The feeder of claim 2 or 4 wherein said means for controlling the flow volume of skin glass comprises means for adjusting said bushings vertically relative to said bowl and said orifices.

6. The method of forming plural, laminated glass articles from discrete composite charges of molten soda-lime-silica glass having a core of molten glass surrounded by a thin layer of molten skin glass comprising, continuously flowing molten core glass through a forehearth to a feeder bowl having a plurality of downwardly opening flow orifices in the bottom thereof, with rotating tube and plunger means for controlling the flow of core glass through said orifices, continuously flowing the molten skin glass into surrounding relationship to the core glass as it passes downwardly out of said orifices, said core glass and skin glass having log viscosity differences no greater than 00.5% and the skin glass being essentially of the same composition as the core glass with the exception that it has a coefficient of expansion of $3-12 \times 10^{-7}$ in/in.°C. less, severing said flow of core and skin glass into composite charges and forming said charges into articles (bottles) by the usual forming technique of pressing, pressing and blowing or blowing and blowing.

7. The method of claim 6 wherein the step of surrounding the core glass with a skin glass is carried out by placing a cylindrical barrier about the flowing core glass issuing from said orifices, said barrier being spaced from said core glass by 0.010-0.050" and said skin glass is continuously flowed in the space between the barrier and core glass.

8. The method of claim 7 wherein the barrier is spaced from the core glass by 0.030".

9. The method of claim 6 wherein the coefficient of expansion of the skin glass is $5 \times 10^{-7}$ in/in.° C. less than the core glass layer.

10. A strengthened, lightweight, blown glass container formed from a composite glass gob having a soda, lime, silica glass core surrounded by a soda, lime silica skin glass with the skin glass layer in the blown container being 0.003"-0.010" thick and having an expansion coefficient of $3-12 \times 10^{-7}$ in/in.° C. less than that of the core glass.

11. The glass container of claim 10 wherein the compressive stress in the surface layer is in the range of 2000psi-3000psi.

* * * * *